(12) United States Patent
Johnson

(10) Patent No.: US 11,914,962 B2
(45) Date of Patent: Feb. 27, 2024

(54) REDUCED TRAINING INTENT RECOGNITION TECHNIQUES

(71) Applicant: Oracle International Corporation, Redwood Shores, CA (US)

(72) Inventor: Mark Edward Johnson, Sydney (AU)

(73) Assignee: Oracle International Corporation, Redwood Shores, CA (US)

( * ) Notice: Subject to any disclaimer, the term of this patent is extended or adjusted under 35 U.S.C. 154(b) by 307 days.

(21) Appl. No.: 16/942,535

(22) Filed: Jul. 29, 2020

(65) Prior Publication Data

US 2021/0082424 A1    Mar. 18, 2021

Related U.S. Application Data

(60) Provisional application No. 62/899,654, filed on Sep. 12, 2019.

(51) Int. Cl.
| | |
|---|---|
| G06F 40/30 | (2020.01) |
| G06N 3/04 | (2023.01) |
| G10L 15/06 | (2013.01) |
| G10L 15/22 | (2006.01) |
| G06F 18/214 | (2023.01) |
| G06F 18/2413 | (2023.01) |

(52) U.S. Cl.
CPC ............ *G06F 40/30* (2020.01); *G06F 18/214* (2023.01); *G06F 18/24147* (2023.01); *G06N 3/04* (2013.01); *G10L 15/063* (2013.01); *G10L 15/22* (2013.01); *G10L 2015/226* (2013.01)

(58) Field of Classification Search
CPC . G10L 15/22; G10L 15/063; G10L 2015/226; G10L 15/02; G06K 9/6256; G06K 9/6276; G06N 3/04; G06F 40/30; G06F 16/3329; G06F 16/3344
See application file for complete search history.

(56) References Cited

U.S. PATENT DOCUMENTS

| | | | |
|---|---|---|---|
| 9,299,347 B1 * | 3/2016 | Siohan | G10L 15/02 |
| 9,911,409 B2 * | 3/2018 | Hong | G10L 15/19 |
| 10,277,743 B1 * | 4/2019 | Agarwal | G06F 40/216 |
| 10,586,532 B1 * | 3/2020 | Cavallo | G10L 15/1815 |
| 10,629,186 B1 * | 4/2020 | Slifka | G10L 15/1815 |
| 10,977,446 B1 * | 4/2021 | Anaya | G06F 40/30 |
| 11,449,726 B1 * | 9/2022 | Sesnowitz | G06N 3/006 |

(Continued)

FOREIGN PATENT DOCUMENTS

| | | |
|---|---|---|
| CN | 109597994 A | 4/2019 |
| WO | 2019081782 A1 | 5/2019 |

OTHER PUBLICATIONS

Han et al., "Data Mining Concepts and Techniques", 3rd Edition, 2012, pp. 1-740.

(Continued)

*Primary Examiner* — Michael Colucci
(74) *Attorney, Agent, or Firm* — Kilpatrick Townsend & Stockton LLP

(57) ABSTRACT

The present disclosure relates generally to determining intent based upon speech input using a dialog system. More particularly, techniques are described using matching-based machine learning techniques to identify an intent corresponding to speech input in a dialog system. These procedures do not require training when intents are added or removed from the set of possible intents.

11 Claims, 7 Drawing Sheets

(56) References Cited

U.S. PATENT DOCUMENTS

| | | | |
|---|---|---|---|
| 2010/0094673 A1* | 4/2010 | Lobo | G06Q 30/0273 |
| | | | 705/14.54 |
| 2019/0043508 A1* | 2/2019 | Sak | G10L 17/00 |
| 2019/0124020 A1* | 4/2019 | Bobbarjung | H04L 51/02 |
| 2020/0005776 A1* | 1/2020 | Curtis | G10L 15/063 |
| 2020/0043483 A1* | 2/2020 | Prabhavalkar | G10L 15/16 |
| 2020/0097563 A1* | 3/2020 | Alexander | G06F 16/61 |
| 2020/0151253 A1* | 5/2020 | Wohlwend | G06N 3/044 |
| 2020/0273078 A1* | 8/2020 | Xu | G06Q 30/04 |
| 2020/0293874 A1* | 9/2020 | Ji | G06N 3/08 |
| 2020/0357143 A1* | 11/2020 | Chiu | G06F 18/253 |
| 2021/0056962 A1* | 2/2021 | McMahon | G10L 15/1822 |
| 2021/0082410 A1* | 3/2021 | Teserra | G06F 40/30 |

OTHER PUBLICATIONS

Wu et al., "Learning Bilinear Model for Matching Queries and Documents", Journal of Machine Learning Research, vol. 14, 2013, pp. 2519-2548.

Application No. PCT/US2020/044198, International Search Report and Written Opinion, dated Oct. 21, 2020, 12 pages.

* cited by examiner

REDUCED TRAINING INTENT RECOGNITION TECHNIQUES

CROSS-REFERENCE TO RELATED APPLICATIONS

The present application claims the benefit and priority under 35 U.S.C. 119(e) of U.S. Application No. 62/899,654, filed on Sep. 12, 2019, entitled "REDUCED TRAINING INTENT RECOGNITION TECHNIQUES," the content of which is herein incorporated by reference in its entirety for all purposes.

TECHNICAL FIELD

The present disclosure relates generally to dialog systems. More specifically, but not by way of limitation, this disclosure describes techniques for using a match function to perform natural language dialog tasks, which can significantly reduce the amount of training required to set up and maintain the dialog system.

BACKGROUND

An increasing number of devices now enable users to interact with the devices directly using voice or spoken speech. For example, a user can speak to such a device in a natural language where the user may ask a question or make a statement requesting some action to be performed. In response, the device performs the requested action or responds to the user's question using voice output. Since interacting directly using voice is a more natural and intuitive way for humans to communicate with their surroundings, the popularity of such speech-based systems is growing at an astronomical rate.

A voice-enabled system that is capable of having a dialog with a user via voice inputs and voice outputs can come in various forms. For example, such a system may be provided as a stand-alone device, as a digital or virtual assistant, as a voice-capable service, and the like. In each of these forms, the system is capable of receiving voice or speech inputs, understanding the inputs, generating responses or taking actions responsive to the inputs, and outputting the responses using voice outputs. In certain embodiments, the dialog functionality in such a voice-enabled system is provided by a dialog system or infrastructure ("dialog system").

Machine learning based techniques are commonly used in dialog systems for various functions. For example, for a voice input, the dialog system may use supervised machine learning techniques to predict an intent for the input, where the intent is selected from a set of preconfigured intents. As another example, in a question-and-answer application, the dialog system may use machine learning techniques to predict answers for input questions. This is commonly achieved using a classifier-based approach, which has to be retrained when a value of interest, or underlying data associated with that value changes. As a result, traditional approaches require frequent retraining which is cumbersome and requires a great deal of time and computing resources to be devoted to these retraining procedures.

BRIEF SUMMARY

The present disclosure relates generally to automatically answering a question using a dialog system. More particularly, techniques are described using matching-based machine learning systems to identify a value (e.g., an intent or answer) corresponding to speech input in a dialog system. Various embodiments are described herein, including methods, systems, non-transitory computer-readable storage media storing programs, code, or instructions executable by one or more processors, and the like.

In certain embodiments, a dialog system receives an input spoken utterance. The dialog system generates a vector representation of the input spoken utterance. The dialog system generates, using a match function, a match score for each key-value pair in a plurality of key-value pairs, wherein the match score generated for each key-value pair is indicative of a degree of matching of a key of the key-value pair to the vector representation of the input spoken utterance, wherein each key in the plurality of key-value pairs is a multidimensional vector representation of a sentence, and wherein the match function is configured to generate a higher match score for a match of two different keys having the same associated value than for a match of two different keys having different associated values. The dialog system identifies, based upon the match scores generated for the plurality of key-value pairs, a particular key-value pair from the plurality of key-value pairs with the highest match score. The dialog system outputs a value associated with the particular key-value pair as a value for the input spoken utterance.

In some aspects, the dialog system further trains the match function using training data, wherein the training comprises adjusting a set of parameters associated with the match function by minimizing a loss function. In some aspects, the dialog system further trains the match function using training data, wherein the training comprises adjusting a set of parameters associated with the match function by maximizing a likelihood function.

In some aspects, values, of the plurality of key-value pairs, are intents. In some aspects, the keys, of the plurality of key-value pairs, are representations of questions, the values, of the plurality of key-value pairs, are answers corresponding to respective questions, the output value associated with the particular key-value pair corresponds to a selected answer, and the value is output as an answer to the input spoken utterance.

In some aspects, the input spoken utterance is a first input spoken utterance, the value is a first value, the match score is a first match score, and the method further comprises, after outputting the first value for the first input spoken utterance, updating, by the dialog system, the plurality of key-value pairs to include additional key-value pairs, receiving, by the dialog system, a second input spoken utterance, generating, by the dialog system using the match function, a second match score for each key-value pair in the updated plurality of key-value pairs, wherein the match function is unchanged between generating the first match score and generating the second match score, identifying, by the dialog system, a second particular key-value pair from the updated plurality of key-value pairs with the highest match score, and outputting, by the dialog system, a second value associated with the second particular key-value pair as a value for the input spoken utterance. In some aspects, the match function includes one of a cosine similarity function, a bilinear function, a single-layer network, a multilayer network, or a nearest-neighbor function.

In some embodiments, a training method for training a match function used in a dialog system is disclosed. The method comprises training the match function with training data. The match function is trained to generate a match score for a key of a key-value pair to another key of another key-value pair in a plurality of key-value pairs. The generated match score is indicative of a degree of matching of the two keys. Each key in the plurality of key-value pairs is a multidimensional vector representation of a sentence. The match function is configured to generate a higher match score for a match of two different keys having the same associated value than for a match of two different keys having different associated values.

In some embodiments, a training apparatus for training a match function used in a dialog system is disclosed. The apparatus comprises means for training the match function with training data. The match function is trained to generate a match score for a key of a key-value pair to another key of another key-value pair in a plurality of key-value pairs. The generated match score is indicative of a degree of matching of the two keys. Each key in the plurality of key-value pairs is a multidimensional vector representation of a sentence. The match function is configured to generate a higher match score for a match of two different keys having the same associated value than for a match of two different keys having different associated values.

In some embodiments, a non-transitory computer-readable medium is disclosed. The non-transitory computer-readable medium stores a plurality of instructions executable by one or more processors. The plurality of instructions comprise instructions that when executed by the one or more processors, cause the one or more processors to perform processing comprising training a match function with training data. The match function is trained to generate a match score for a key of a key-value pair to another key of another key-value pair in a plurality of key-value pairs. The generated match score is indicative of a degree of matching of the two keys. Each key in the plurality of key-value pairs is a multidimensional vector representation of a sentence. The match function is configured to generate a higher match score for a match of two different keys having the same associated value than for a match of two different keys having different associated values.

Embodiments further include systems, computer-readable memories, and programs configured for performing the methods described herein.

The foregoing, together with other features and embodiments will become more apparent upon referring to the following specification, claims, and accompanying drawings.

DETAILED DESCRIPTION

Figure 1:
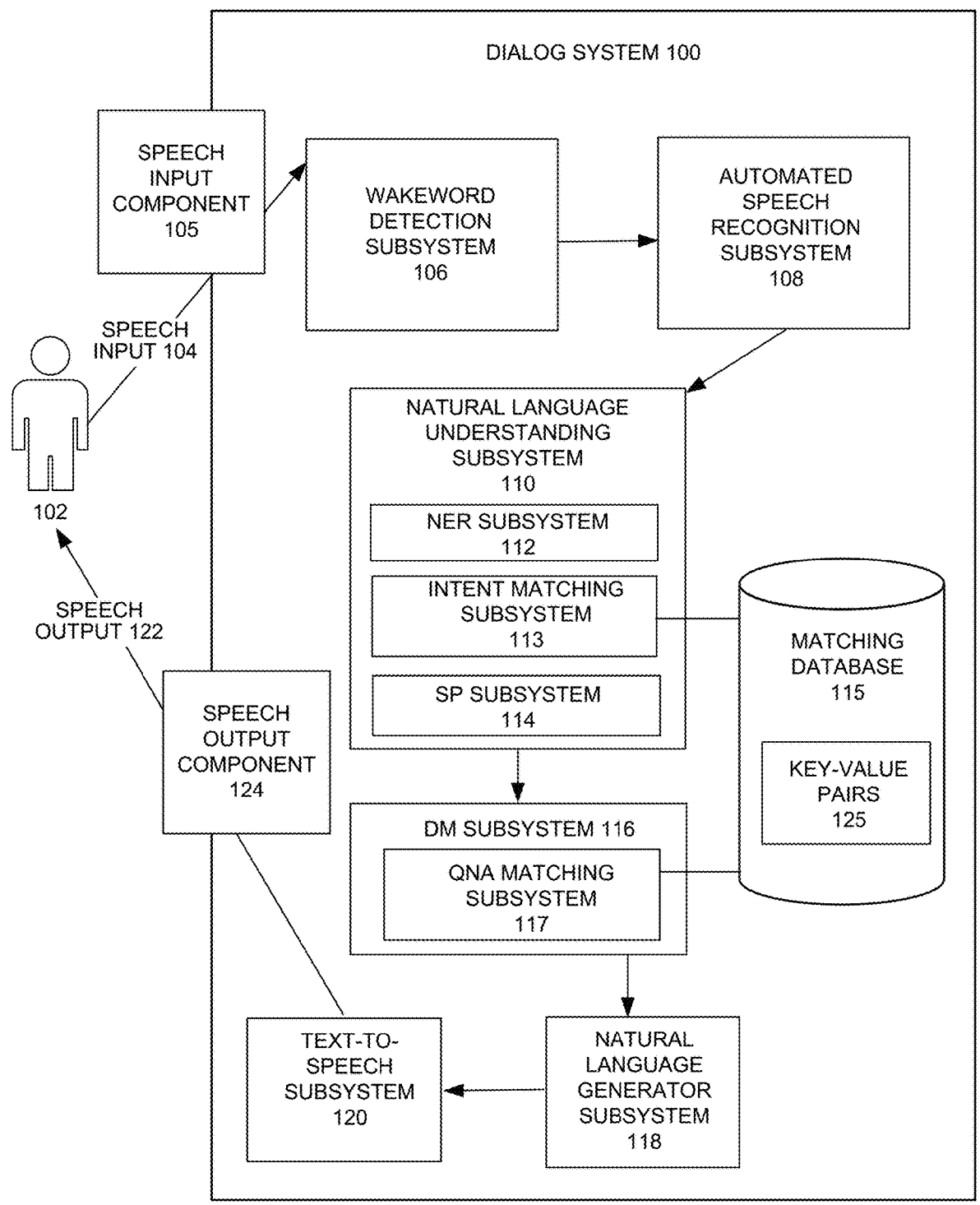
FIG. 1 is a simplified block diagram depicting a dialog system according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to techniques for using matching-based machine learning techniques to identify a value for speech input in a dialog system. The value may correspond to an intent or an answer to a question. The identified value may be tied to a system-supported function such as making a purchase and finding directions. These techniques for using a match function to determine a value do not require training when values are added or removed from the set of possible values. This enables developers to add intents or answers to a chatbot or digital assistant and to immediately test the system with the new intents or answers, without waiting for a training step.

Most machine learning-based techniques require a training step. This training step can be compute intensive and can thus take a day or even more time. Even very fast training takes minutes (e.g., 5-15 minutes is considered fast training). As a result, in existing chatbot systems that use conventional machine learning-based classifiers, it is very difficult to update the system (for example, add functionalities to a chatbot system) and deploy the system in a timely manner, since the system needs to be retrained due to the update.

For example, given a user query or an utterance, traditionally, a classifier based upon traditional classification algorithms is used to determine an intent for the query. A model built using a machine learning technique is used as the classifier and used to perform the classification, and building the model requires a training step. These classifier models require a retraining when the underlying data (e.g., the set of candidate classes) changes. As a specific example, in traditional classifier approaches such as supervised classification, when a new intent is added to the chatbot or digital assistant, the machine learning training algorithm has to be re-run in order to learn to handle the new intent. Accordingly, there is a significant time delay between adding a new intent to the training data and having an updated procedure for mapping user requests to intents. This time delay makes it difficult for developers to interactively develop chatbots or digital assistants with novel intents, or to give demonstrations of chatbot or digital assistant development toolkits that involve adding new intents.

Techniques described herein do not require such retraining. For example, the developer can add new intents to the system and try them out without retraining. New techniques are disclosed for performing a task in a dialog system, such as intent recognition or question answering, using a different type of algorithm that does not require retraining when intents are added or removed. As described herein, a match function is used for identifying values for an utterance instead of a traditional classification algorithm.

Match Function Example

In some embodiments, an information retrieval technique (e.g., a match function), which does not need to be retrained each time that a set of candidate intents changes, is used to solve an intent determination problem. Accordingly, the intent determination problem is solved using a technique that is different from the traditional classification algorithm based technique—an information retrieval technique (a match function) is used to solve the problem. Alternatively, or additionally, a match function can be used to perform other tasks in a dialog system, such as question answering.

In a chatbot system environment, a match function is obtained by learning. The match function is then used to match a user request utterance to a candidate utterance that is given for each intent in the set of candidate intents. The user request utterance, for which an intent is to be determined, is matched against the set of candidate utterances provided for the set of candidate intents.

In some embodiments, a key-value pair retrieval technique is used. For example, in a question and answer (QnA) setting for a chatbot system, the question or query that is asked by the user is matched to a key from a set of multiple keys, and the value associated with that matched key is retrieved. The value may be output as a response to the query, or used to determine a response to the query.

For example, matching-based value determination may be executed as follows:
(1) A query is received from a user.
(2) The query is compared to keys of a set of key-value pairs. For example, the keys are sample utterances such as sentences and the values are corresponding intents. The key-value pairs may be configured by a customer for whom the chatbot system is being built. The best matching key to the query is identified.
(3) The value associated with the best matching key is then used for downstream processing. For example, the value may be output as a response for the query. As another example, the value may identify an intent corresponding to the query, which may then be used to generate a response Typically, there are multiple keys that are associated with the same value. In such scenarios, a match function (or model) is generated that preferentially matches two keys mapping to the same value over keys pointing to different values. As an example, the model is trained such that the key "get me a new account" preferentially matches to the key "How can I open an account?" with a higher match score than "Can I close my account?". This is because both keys match the same value (e.g., an OPEN_ACCOUNT intent), while "can I close my account?" maps to a different value (e.g., a CLOSE_ACCOUNT) intent). Similarly, "how can I open an account?" matches "get me a new account" with a higher match score than "can I close my account?". The training process is to learn a match function such that the keys with the same values preferentially match each other over keys with different values. The match function is trained such that a match score that indicates the degree of match is higher for keys mapping to the same value as compared to keys mapping to different values.

In certain embodiments, the match function returns a ranked list of matches based upon match scores. In the chatbot context, the match with the highest score is selected. Different types of match functions may be used. The match functions may have parameters, and as part of the learning process, these parameters are adjusted so that keys with same values match better than keys with different values. Some match functions may not have their own parameters (e.g., the dot product/cosine similarity algorithm).

In certain embodiments, a neural network may be used to produce embeddings based upon input training key-value pairs that are used to generate the match functions. During the training process, the parameters of the neural network and the parameters of the match function are adjusted such that keys with the same associated values match better than keys with different values.

In some embodiments, to ensure that the match function matches all the keys that map to the same value with a higher match score than it does to keys mapping to different values, the keys that are associated with the same values are treated as positive pairs, and keys that have different values are treated as negative pairs. The match function is trained to ensure that positive pairs (e.g., two keys mapping to the same value) have a higher match score than a corresponding negative pair (e.g., two keys mapping to different values). The match score for positive pairs should be higher than the match score for negative pairs. There may be multiple positive pairs, and two different positive pairs may have different match scores, as long as the scores are higher than the match scores for negative pairs. The training is done to ensure that the match function is such that positive pairs are at the top of the list of matches and to ensure that a positive pair tops the list (i.e., has the highest match score).

The match function can be generated using different techniques. In some embodiments, the match function can be determined based upon ranking algorithms. In some embodiments, the match function can be determined based upon probabilities instead of ranking. Accordingly, there are different ways of generating match functions.

Use of the Match Function

A match function, as learnt above, is then used to find a matching key (from a data set comprising multiple key-value pairs) for a query from a user. The query is matched against all the keys using the match function, and the best-matched key (with the highest match score) is identified. A matching key is identified using the match function. The value associated with the best matched key is then retrieved and used for downstream processing. For example, the value may represent an intent for the query. As another example, the value may be output as a response to the query.

The model can be used to find a matching key for a query where there is an exact match of the query to the key, or even when the query differs from the key in certain portions.

Differences from a Standard Classifier

In a standard classification technique, a data set D is used to train a classifier. The standard classifier-based approach has the property that it will never return a value that was not seen in its training data set D. Whereas in the techniques disclosed in this disclosure, a match function is used rather than a classification algorithm. The match function was trained on a different data set (or even, the match function was not trained at all) and the data set that is used at runtime does not have to be the same as the data set that was used to train the match function. Because the data set used at runtime does not have to be the same as the data set that was used to train the match function, the match function has the possibility of returning values that were not present in the training data set used to learn the match function. This enables, for example, the addition of new intents without the need to go through a retraining process.

Example Dialog System

FIG. 1 illustrates an example of a dialog system 100, according to some embodiments. The dialog system 100 is configured to receive voice or speech inputs 104 (also referred to as speech utterances) from a user 102. The dialog system 100 may then interpret the voice inputs. The dialog system 100 may maintain a dialog with the user 102, and possibly perform or cause one or more actions to be performed based upon interpretations of the voice inputs. The dialog system 100 may prepare appropriate responses, and output the responses to the user using voice or speech output. The dialog system 100 is a specialized computing system that may be used for processing large amounts of data using a large number of computer processing cycles. The numbers of devices depicted in FIG. 1 are provided for illustrative purposes. Different numbers of devices may be used. For example, while each device, server, and system in FIG. 1 is shown as a single device, multiple devices may instead be used.

In certain embodiments, the processing performed by a dialog system is implemented by a pipeline of components or subsystems, including a speech input component 105, a wake-word detection (WD) subsystem 106, an automatic speech recognition (ASR) subsystem 108, a natural language understanding (NLU) subsystem 110, which includes a named entity recognizer (NER) subsystem 112, an intent matching subsystem 113, and a semantic parser subsystem 114, a matching database 115, a dialog manager (DM) subsystem 116, which may include a QnA matching subsystem 117, a natural language generator (NLG) subsystem 118, a text-to-speech (TTS) subsystem 120, and a speech output component 124. The subsystems listed above may be implemented only in software (e.g., using code, program, or instructions executable by one or more processors or cores), in hardware, or in a combination of hardware and software. In certain implementations, one or more of the subsystems may be combined into a single subsystem. Additionally or alternatively, in some implementations, the functions described herein as performed by a particular subsystem may be implemented by multiple subsystems.

The speech input component 105 includes hardware and software configured to receive speech input 104. In some instances, the speech input component 105 may be part of the dialog system 100. In some other instances, the speech input component 105 may be separate from and be communicatively coupled to the dialog system 100. The speech input component 105 may, for example, include a microphone coupled to software configured to digitize and transmit speech input to the wake-word detection subsystem 106.

The wake-word detection (WD) subsystem 106 is configured to listen for and monitor a stream of audio input for input corresponding to a special sound or word or set of words (referred to as a wake-word). Upon detecting the wake-word configured for the dialog system 100, the WD subsystem 106 is configured to activate the ASR subsystem 108. In certain implementations, a user may be provided the ability to activate or deactivate the WD subsystem 106 (e.g., by speaking the wake-word pushing a button). When activated (or operating in active mode), the WD subsystem 106 is configured to continuously receive an audio input stream, and process the audio input stream to identify audio or voice input corresponding to the wake-word. When audio input corresponding to the wake-word is detected, the WD subsystem 106 activates the ASR subsystem 108.

As described above, the WD subsystem 106 activates the ASR subsystem 108. In some implementations of the voice-enabled system, mechanisms other than wake-words may be used to trigger or activate the ASR subsystem 108. For example, in some implementations, a push button on a device may be used to trigger the ASR subsystem 108 processing without needing a wake-word. In such implementations, the WD subsystem 106 may not be provided. When the push button is pressed or activated, the speech input received after the button activation is provided to the ASR subsystem 108 for processing. In some implementations, the ASR subsystem 108 may be activated upon receiving an input to be processed.

The ASR subsystem 108 is configured to receive and monitor spoken voice input after a trigger or wake-up signal (e.g., the wake-up signal may be sent by the WD subsystem 106 upon the detection of a wake-word in the speech input, the wake-up signal may be received upon the activation of a button, etc.) and to convert the voice input to text. As part of its processing, the ASR subsystem 108 performs speech-to-text conversion. The spoken speech or voice input may be in a natural language form, and the ASR subsystem 108 is configured to generate the corresponding natural language text in the language of the speech input. The text generated by the ASR subsystem is then fed to the NLU subsystem 110 for further processing. The voice input received by the ASR subsystem 108 may include one or more words, phrases, clauses, sentences, questions, etc. The ASR subsystem 108 is configured to generate a text utterance for each spoken clause and feed the text utterances to the NLU subsystem 110 for further processing.

The NLU subsystem 110 receives texts generated by the ASR subsystem 108. The texts received by the NLU subsystem 110 from the ASR subsystem 108 may include text utterances corresponding to spoken words, phrases, clauses, etc. The NLU subsystem 110 translates each text utterance (or a series of text utterances) to its corresponding logical form.

In certain implementations, the NLU subsystem 110 includes a named entity recognizer (NER) subsystem 112, an intent matching subsystem 113, and a semantic parser (SP) subsystem 114. The NER subsystem 112 receives a text utterance as input, identifies named entities in the text utterance, and tags the text utterance with information related to the identified named entities. The tagged text utterances are then fed to the SP subsystem 114, which is configured to generate a logical form for each tagged text utterance (or for a series of tagged text utterances), and to the intent matching subsystem 113, which is configured to identify one or more intents corresponding to the text utterance, which may be used by the SP subsystem 114 in generating the logical form.

An intent for an utterance identifies an objective of the utterance. Examples of intents include "Order_Pizza" and "Find_Directions." Each intent is given an intent identifier or intent name. For example, intents that the intent matching subsystem 113 is trained to recognize may include "CheckBalance," "TransferMoney," "DepositCheck," and the like. An intent may, for example, identify an action that is requested to be performed. Intents may represent categories or classes that the dialog system is trained to infer for input utterances. Upon receiving an utterance, the intent matching subsystem 113 may determine an intent for the utterance, where the inferred intent is selected from a predefined set of intents used to train the intent matching subsystem 113. The dialog system then takes an appropriate action responsive to an utterance based upon the intent inferred for that utterance.

For each intent defined, a designer may provide one or more example utterances that are representative of and illustrate the intent. These example utterances are meant to represent utterances that a user may input to the dialog system for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the intent matching subsystem 113. As a result of this training, a predictive model (e.g., the match function) is generated that is configured to take an utterance as input and output an intent inferred for the utterance.

In some instances, input utterances are provided to the intent matching subsystem 113, which is configured to use the trained model to predict or infer an intent for the input utterance. The dialog system may then take one or more actions based upon the inferred intent. The intent matching subsystem 113 may apply a match function to a text utterance to predict an intent corresponding to the text utterance, as described herein. The intent matching subsystem 113 may interact with the matching database 115 to apply the match function. The matching database 115 may store a plurality of key-value pairs which map representations of sample text utterances to values. In some embodiments, the text utterances are keys in the key-value pairs, and the intents are values in the key-value pairs. Alternatively, or additionally, values in the key-value pairs may correspond to answers to questions. The intent matching subsystem 113 may apply the match function to identify a key, stored to the matching database 115, which best matches a text utterance. The intent matching subsystem 113 may then identify a corresponding value, thereby predicting an intent corresponding to the text utterance.

In addition to intents, a logical form generated for a text utterance may also identify slots (also referred to as parameters or arguments) for the identified intent. For example, for the speech input "I'd like to order a large pepperoni pizza with mushrooms and olives," the NLU subsystem 110 can identify the intent order pizza. The NLU subsystem can also identify and fill slots, e.g., pizza_size (filled with large) and pizza_toppings (filled with mushrooms and olives). The NLU subsystem may use machine learning based techniques, rules (which may be domain specific), or a combination of the two, to generate the logical forms. The logical forms generated by the NLU subsystem 110 are then fed to the DM subsystem 116 for further processing.

The DM subsystem 116 is configured to manage a dialog with the user based upon logical forms received from the NLU subsystem 110. As part of the dialog management, the DM subsystem 116 is configured to track dialog states, initiate the execution of or itself execute one of more actions or tasks, and determine how to interact with the user. These actions may include, for example, querying one or more databases, producing execution results, and other actions. For example, the DM subsystem 116 is configured to interpret the intents identified in the logical forms received from the NLU subsystem 110. Based upon the interpretations, the DM subsystem 116 may initiate one or more actions that it interprets as being requested by the voice inputs provided by the user.

In certain embodiments, the DM subsystem 116 performs dialog states tracking based upon current and past voice inputs and based upon a set of rules (e.g., dialog policies) configured for the DM subsystem 116. These rules may specify the different dialog states, conditions for transitions between states, actions to be performed when in a particular state, and the like. These rules may be domain specific.

In some embodiments, the DM subsystem 116 uses the Question-and-Answer (QnA) matching subsystem 117 to identify answers to queries. The QnA matching subsystem 117 may apply a match function to a text utterance to predict an answer corresponding to the query, as described herein. The QnA matching subsystem 117 may interact with the matching database 115 to apply the match function. As described above, the matching database 115 may store a plurality of key-value pairs which map text utterances to values, which may correspond to answers to questions. The QnA matching subsystem 117 may apply the match function to identify a key, stored to the matching database 115, which best matches a text utterance (e.g., a query, such as a query posed by a user via voice input). The intent matching subsystem 113 may then identify a corresponding value, thereby predicting an answer corresponding to the text utterance.

The DM subsystem 116 also generates responses to be communicated back to the user involved in the dialog. These responses may be based upon actions initiated by the DM subsystem 116 and their results. The responses generated by the DM subsystem 116 are fed to the NLG subsystem 118 for further processing.

The NLG subsystem 118 is configured to generate natural language texts corresponding to the responses generated by the DM subsystem 116. The texts may be generated in a form that enables them to be converted to speech by the TTS subsystem 120. The TTS subsystem 120 receives the texts from the NLG subsystem 118 and converts each of them to speech or voice audio, which may then be output to the user via an audio or speech output component 124 of the dialog system (e.g., a speaker, or communication channel coupled to an external speaker). In some instances, the speech output component 124 may be part of the dialog system 100. In some other instances, the speech output component 124 may be separate from and communicatively coupled to the dialog system 100.

As described above, the various subsystems of the dialog system 100 working in cooperation provide the functionality that enables the dialog system 100 to receive speech inputs 104 and respond using speech outputs 122 and maintain a dialog with a user using natural language speech. The various subsystems described above may be implemented using a single computer system or using multiple computer systems working cooperatively. For example, for a device implementing the voice-enabled system, the subsystems of the dialog system 100 described above may be implemented entirely on the device with which the user interacts. In some other implementations, some components or subsystems of the dialog system 100 may be implemented on the device with which the user interacts, while other components may be implemented remotely from the device, possibly on some other computing devices, platforms, or servers.

As described above, in certain embodiments, a dialog system 100 may be implemented using a pipeline of subsystems. In some embodiments, one or more of the subsystems may be combined into a single subsystem. In certain embodiments, the functionality provided by a particular subsystem may be provided by multiple subsystems. A particular subsystem may also be implemented using multiple subsystems.

In certain embodiments, machine learning techniques may be used to implement one or more functions of the dialog system 100. For example, supervised machine learning techniques such as those implemented using a neural network (e.g., a deep neural network) may be used to implement one or more functions of the dialog system 100. As one example, a neural network may be provided that is trained to perform ASR functions performed and such a trained model may be used by the ASR subsystem 108 for its processing. Such a neural network implementation may take the speech input as input and output a text utterance to the NLU subsystem. Machine learning based models may also be used by other subsystems of the dialog system 100.

Determining Values Using a Match Function

Figure 2:
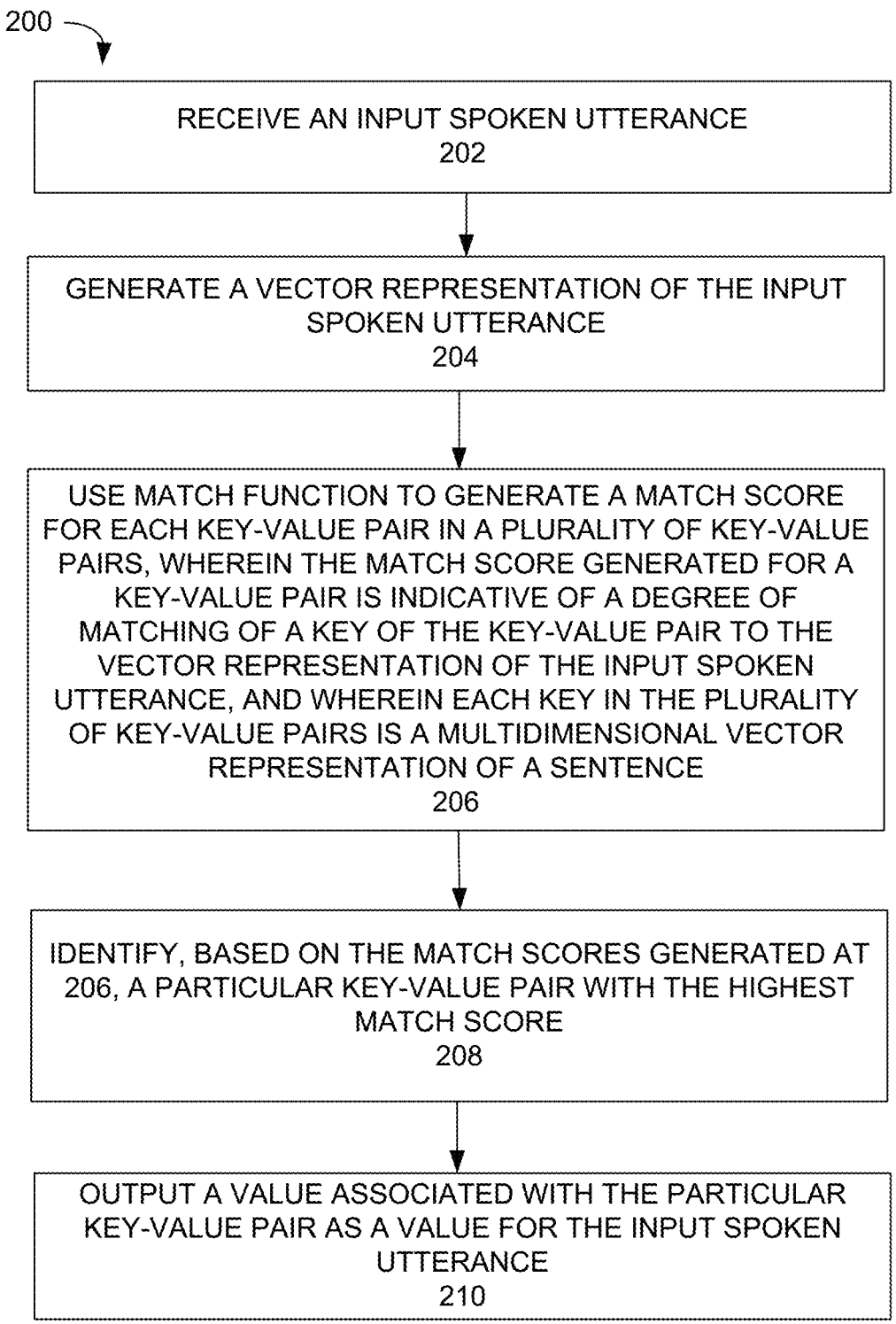
FIG. 2 is a simplified flow chart of a method for matching an input spoken utterance to a value according to some embodiments.

FIG. 2 depicts a simplified flowchart illustrating a method 200 for determining values using a match function according to some embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 2 may be performed by the dialog system 100 described above with respect to FIG. 1.

As shown in FIG. 2, at 202, an input spoken utterance is received. The input spoken utterance may originate from words spoken by a user. The dialog system may receive the input spoken utterance, for example, from a user via the speech input component 105. The input spoken utterance may be received as a wave form. The input spoken utterance may in a particular language and be in a natural language query form. The input spoken utterance may specify a question that the user wants the dialog system to answer, specify one or more actions that the user wants the dialog system to initiate (e.g., "I would like a medium pepperoni pizza."), and the like. The input spoken utterance may be processed by the ASR subsystem 108 to generate a text utterance which is passed to the NLU subsystem 110 for further processing.

In certain embodiments, instead of receiving a speech input (as in 202), input may be received in text form, for example, when a user types in text during a chat with a dialog system. The techniques described in this disclosure can be used with systems that receive input in the form of spoken speech, or text input, or combinations thereof.

At 204, the dialog system generates a vector representation of the input spoken utterance. The dialog system may use a text utterance, as generated at 202, to generate a sentence encoding of the input spoken utterance. The dialog system may generate an encoded version of the input spoken utterance for processing (e.g., a set of word embeddings containing a separate embedding for each word in the input spoken utterance, where each embedding is a multi-dimensional feature vector containing values for features of a corresponding word).

At 206, the dialog system uses a match function to generate a match score for each key-value pair in a plurality of key-value pairs. The dialog system may compute a plurality of match scores by applying the match functions to a plurality of keys, in the respective key-value pairs and the vector representation of the input spoken utterance generated at 204. The match score generated for a key-value pair is indicative of a degree of matching of a key of the key-value pair to the vector representation of the input spoken utterance.

The dialog system may store a plurality of key-value pairs 125 in the matching database 115. Each key-value pair includes a key, which may be a text string or a representation thereof. The keys may correspond to a user query, such as "I need directions to your store," or "How do I change my cable subscription?".

In some embodiments, each key in the plurality of key-value pairs is a multidimensional vector representation of a sentence, phrase, word, or set of words. The keys may be encoded as dense vectors (e.g., as sentence embeddings), so each $k_i \in R^d$, where d is the dimensionality of the embedding. The embeddings encode words and sentences into fixed-length vectors. For example, the embeddings may be sentence embeddings such as Bidirectional Encoder Representations from Transformers (BERT) or Universal Sentence Encoder embeddings. The embeddings may be trained using machine-learning techniques (e.g., using a neural network). The embeddings may be used to generalize the speech input types. Accordingly, the dialog system may generate a trained set of embeddings representing the plurality of sample utterances, and the embeddings may be used to compute the match scores. In some embodiments, universal embeddings may be implemented. The use of universal embeddings may facilitate identifying a value based upon the input regardless of the language in which the input is received.

In some embodiments, the key can incorporate more information than just the sample utterance (e.g., a question or statement) alone. For example, the key might include information that is extracted from the associated answer or value (e.g., the key could be a linear combination of the question embedding and the answer embedding). As a specific example, the value corresponding to a key is a link to a website. The key may include information derived from the link to the website (e.g., words on that website). This can used to facilitate the matching process. For example, for the key "close my account," another term for "close" is "shut." The website may include the phrase "instructions to shut account." Including such information derived from a value can facilitate discerning intent across a greater variety of speech inputs.

For each key-value pair, the key may be mapped to a respective value, which may be an intent, an answer to a question, or other suitable values. The values can be represented as $v_i \in V$, where V is the set of values. The values may or may not be embedded. Each key, of the plurality of key-value pairs, may be stored in association with a corresponding value in the matching database 115. For example, a vector representation of the utterance "I need directions to your store" is mapped to the intent FIND-DIRECTIONS. Alternatively, or additionally, the keys and values may correspond to questions and answers, where the key corresponds to a question and the value provides an answer to the question. As an example, Table 1 illustrates a set of key-value pairs.

TABLE 1

| Key | Value |
| --- | --- |
| How can I open an account? | http://xxx.com/open |
| Get me a new account. | http://xxx.com/open |
| Can I close my account? | http://xxx.com/close |

Three keys are stored to the table in association with value. In the example illustrated in Table 1, the keys are queries, e.g., "How can I open an account?"). The values correspond to answers paired with the respective queries. In the example shown in Table 1, the values are URLs that can be used to illustrate to a user how to open or close an account. The keys and values may be stored to the matching database 115 as $D=((k_1, v_1), \ldots, (k_n, v_n))$, where $k_i$ is the $i^{th}$ speech input type or key, and $v_i$ is the corresponding value.

In some embodiments, the values are intents. In this case, each key may represent a sample utterance and each corresponding value is an intent for that sample utterance. For example, a key-value pair may consist of the key: "One large pepperoni," with the corresponding value Order_Pizza. Alternatively, or additionally, the keys, of the plurality of key-value pairs, are representations of questions, and the values, of the plurality of key-value pairs, are answers corresponding to respective questions. For example, a key-value pair may include the key "How much is a large pepperoni pizza?" and corresponding value "$19.99."

The dialog system computes the match scores by applying a match function to the plurality of sample utterances and the speech input received at 202. The match function may be applied to each stored key, along with the input spoken utterance received at 202. The match function may return how well a received input spoken utterance matches a stored sample utterance. The match function may be associated with parameters ⊖ that may be learned or fine-tuned using an information retrieval machine learning method such as a ranking algorithm or a probabilistic algorithm. The match function may be configured to generate a higher match score for a match of two different keys having the same associated value than for a match of two different keys having different associated values.

In some embodiments, the match function Match( )maps a query q and key k to a real-valued match score Match(q; k). The query corresponds to the input spoken utterance at 202. As a specific example, the corpus of stored key-value pairs is a data set D. A dataset $D=((k_1, v_1), \ldots, (k_n; v_n))$ consists of n key-value pairs $(k_i, v_i)$, where $k_i$ is the key and $v_i$ is the associated value. Given speech input q, the system returns the key-value pair in D with the best matching key. The function BestMatch( )returns the best-matching key-value pair:

$$\text{BestMatch}\ominus(q, D) = \text{argmax}_{(k,v)} \in D \; \text{Match}\ominus(q,k) \quad [1]$$

Here q is a sentence encoding of the speech input, and ⊖ is a vector of parameters of the match function. The match functions are further based upon training triples T of positive and negative key pairs, as further described below with respect to FIG. 3. Example match function implementations include:

TABLE 2

| Name | Match function | Parameters |
|---|---|---|
| Dot product or cosine | $q^T k$ | (None) |
| Bilinear | $q^T W k$ | $W \in R^{d \times d}$ |
| 1-layer network | $c^T W (k; q)$ | $c \in R^{2d}; W \in R^{2d \times 2d}$ |
| Multilayer network | $c^T W_1$ ReLU($W_2 (k; q) + b$) | $b, c \in R^{2d}; W_1, W_2 \in R^{2d \times 2d}$ |

Some match functions return an inverse distance (e.g., dot-product score), in which case the matching problem constitutes finding a pair in D whose key k is closest to the speech input/query q. The dot product/cosine implementation uses a cosine similarity function. Cosine similarity provides a measure of similarity of two vectors based upon the cosine of the angle between them. (See, e.g., Jiawei Han et al., *Getting to Know Your Data in Data Mining* (Third Edition) (2012)). The dot product/cosine match function does not have parameters necessitating training data, although training data might still be useful for fine-tuning the sentence embedding model that produces the sentence encodings of the speech input types.

The remaining match functions illustrated in Table 2 have parameters ⊖ (third column), which may be estimated from training data as described below with respect to FIGS. 3 and 4. The bilinear implementation uses a bilinear function, as described in, e.g., Wei Wu and Zhendong Lu Hang Li, *Learning Bilinear Model for Matching Queries and Documents*, Journal of Machine Learning research 14, 2519-2548 (2013). The 1-layer network is a single-layer neural network. The multilayer network is a multilayer neural network. The example match function for the multilayer network implementation illustrated in Table 2 includes ReLU, a rectified linear unit activation function. However, other non-linearities such as tan h( )could be used in place of ReLU( ).

Alternatively, or additionally, a probabilistic model (e.g., a nearest-neighbor function) may be implemented. The probabilistic model involves calculating a partition function. Back-propagating through the partition function may be challenging if the training data set is large. The error-driven approximation should require relatively low memory use. An example probabilistic model is:

$$P_\theta(v | \theta.D) = \frac{\sum_{(k',v') \in D_v} \exp(\text{Match}_\theta(q, k'))}{\sum_{(k',v') \in D} \exp(\text{Match}_\theta(q, k'))}, \quad [2]$$

where:

$$D_v = \{(k', v') \in D, v' = v\} \quad [3]$$

$D_v$ is the subset of pairs in D with the value v. The probabilistic model given by equations [2] and [3] is an exponential model over D which marginalizes over the keys k and uses the match score as the potential.

The match function may be trained at some initial time to generate the parameters ⊖. The training may involve optimizing ⊖ for the data set D using a neural network, as described below with respect to FIGS. 3 and 4. The dialog system may initially train the match function using training data, wherein the training comprises adjusting a set of parameters associated with the match function by minimizing a loss function, as described with respect to FIG. 3. Alternatively, or additionally, the training may comprise adjusting the set of parameters associated with the match function by maximizing a likelihood function, as described with respect to FIG. 4.

Accordingly, prior to receiving the input spoken utterance at 202, the dialog system may determine a set of parameters of the match function based upon a set of pairs of sample keys and values. The pairs of sample keys and values used for training may be the same as those stored and used in computing the match scores. Alternatively, the pairs of sample keys and values used for training may be different than those stored and used in computing the match scores. Accordingly, keys and values may be added or removed after the initial training.

Using the match function, the dialog system may generate various match scores, corresponding to the similarity between the vector representation of the input spoken utterance and the respective stored keys. For example, the speech input "How do I get to Montreal?" may have a match score of 10 with "Find directions to Montreal," and a match score of 4 with "What is Montreal?".

At 208, the dialog system identifies, based on the match scores generated at 206, a particular key-value pair with the highest match score. The dialog system may compare the match scores generated at 206 to identify the key-value pair with the highest match score. For example, the utterance "How much is a hamburger?" has a 70% match score with the key "How much is a ham sandwich," an 80% match score with the key "How much is a veggie burger," and a 100% match score with the key "How much is a hamburger?". Accordingly, the matching key-value pair with the 100% match score, "How much is a hamburger?", is identified. Alternatively, in some embodiments, the dialog system may assign match scores inversely proportional to the level of matching, in which case the key-value pair with the lowest match score may be selected.

At 210, the dialog system outputs a value associated with the particular key-value pair as a value for the input spoken utterance. In some embodiments, the dialog system selects the corresponding value, from the key-value pair identified at 308, and generates and provides a response corresponding to the selected value.

The dialog system may traverse the key-value pair with the highest match score selected at 208 to identify the value therein. The value may correspond to an intent, an answer, or other information used to perform dialog processing. As a specific example, the intent matching subsystem identifies an intent mapped to the key "Find directions to Montreal" after determining that the key "Find directions to Montreal" has the highest match with an input utterance. The identified intent is DIRECTIONS_TO, which is stored in association with the stored key with the highest match score. As another example, the QnA matching subsystem may identify an answer to a question or an URL that can be used to retrieve an answer stored in association with the highest-matching key (e.g., the QnA matching subsystem may identify the address of the nearest coffee shop, as value mapped to the highest-scored key, "Where is he nearest coffee shop?"). In this case, the output value associated with the particular key-value pair may correspond to a selected answer, and the value is output as an answer to the input spoken utterance.

The dialog system may output the value to a user and/or to another subsystem of the dialog system. As an example of the latter, the intent matching subsystem 113 outputs an identified intent to the SP subsystem 114 for generating a logical form based in part upon the identified intent. In some cases, the dialog processing pipeline will continue to generate output to a user. The output to the user may include the identified value and/or a derivative thereof as speech output and/or a visual cue.

In some embodiments the dialog system generates a response which includes or is derived from the selected value. For example, the value is an intent, FIND_STORE. The dialog system may use GPS or a follow-up question to identify the user's location, and identify a store closest to the identified location. The dialog system may then package the identified store as a user-friendly response (e.g., by adding words to form a complete sentence, such as "Jay's Party Supply is at 3215 Main Street. Would you like directions?" In some embodiments, the selected value may include information including the response or part of the response (e.g., the QnA matching subsystem may identify an URL such as those shown in Table 1 above).

The dialog system may provide the response as output (e.g., to a user that provided the input spoken utterance at 202) via speech output (e.g., by converting a text response generated by the dialog manager subsystem 116 and the natural language generator subsystem 118 to speech output via the text-to-speech subsystem 120). Alternatively, or additionally, the dialog system may provide the response by causing display of a text response on a display component of a user device.

Subsequently, values may be added to, or removed from, the stored key-value mappings. The dialog system may process a second input spoken utterance, without retraining the model to handle the changed values. For example, the input spoken utterance received at 202 is a first input spoken utterance and the value output at 210 is a first value. After determining the first value, the dialog system updates the set of key-value pairs to include additional keys and/or values. For example, a customer may provide a set of additional questions and answers that they wish to enable a call center chat bot to handle. The dialog system's database is updated to reflect the updated set of key-value pairs (e.g., by storing additional key-value pairs to the dataset). As a specific example, the dialog system may add a key-value pair including the sample utterance "I want to return . . ." and the intent RETURN_ITEM, a key-value pair including the sample utterance "How do I return something?" with the intent RETURN_ITEM, and so forth, with a number of key-value pairs including different keys corresponding to the new value RETURN_ITEM. The dialog system then receives a second input spoken utterance. The second input spoken utterance may correspond to the recently-added value (e.g., the second speech input is "I want to return a shirt," which matches to a key that is mapped to the intent RETURN_ITEM). The dialog system determines a second value corresponding to the second input spoken utterance using the match function (e.g., as described above with respect to 204-208). The dialog system is not retrained between adding the additional key-value pairs and processing the second input spoken utterance (e.g., the set of parameters of the match function is unchanged between determining the first value and determining the second value). As another example, values can be removed from the set of possible values on the fly. One example application of adding and removing intents on the fly is enabling each user is associated with their own personalized set of intents.

Figure 3:
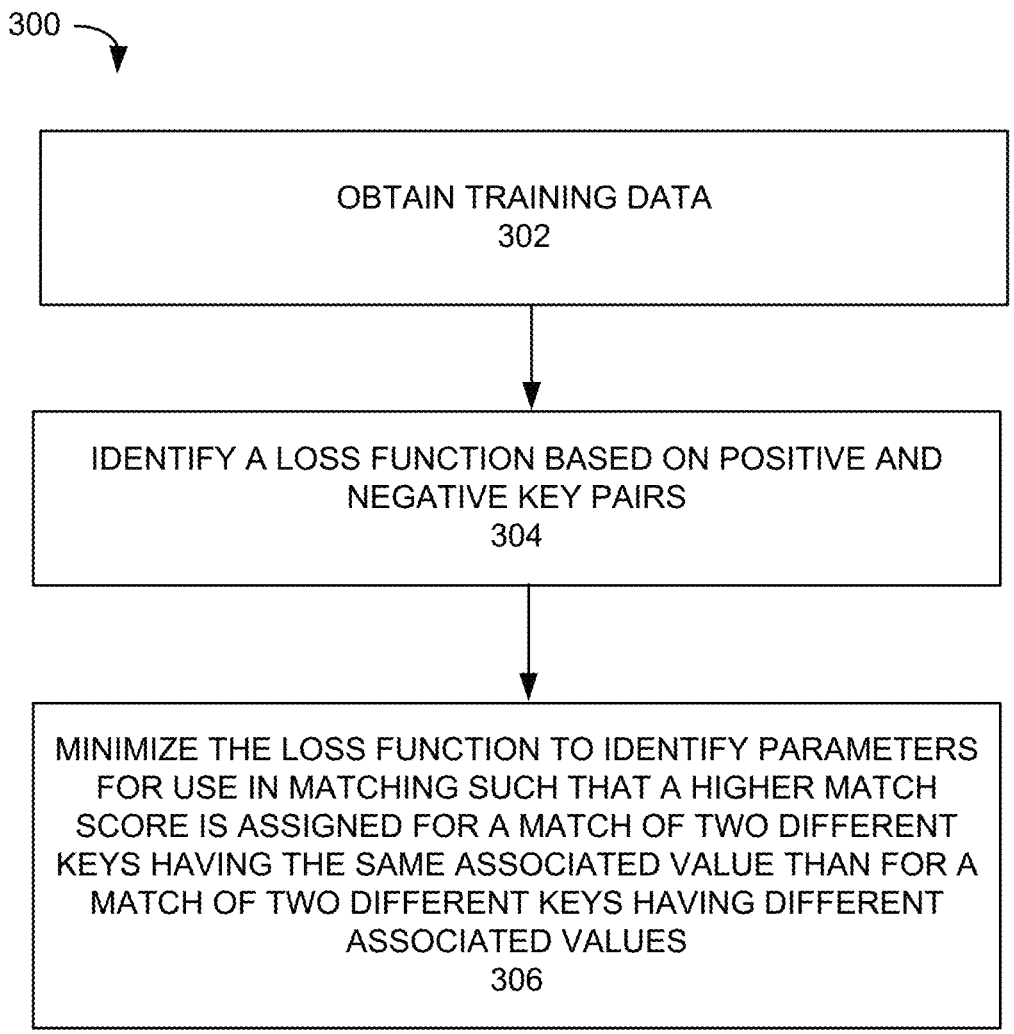
FIG. 3 depicts a simplified flow chart depicting example processing performed during a setup phase according to certain embodiments.

FIG. 3 depicts a simplified flowchart 300 depicting processing performed during the setup phase according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 3 may be performed by a dialog system, as described above.

The processing depicted in FIG. 3 may be used in a training step to configure the parameters of the match function. As described above with respect to FIG. 2, prior to receiving the input spoken utterance at 202, the dialog system may execute a training process resulting in set of parameters of the match function. In some embodiments, this involves minimizing a loss function of a set of key-value pairs, which may be executed using the processing depicted in FIG. 3.

As shown in FIG. 3, at 302, the dialog system obtains training data. The dialog system may obtain training data from various sources such as from prior speech input received by the system, from a customer, and/or by Web scraping. For example, the training data might consist of thousands of pairs of speech input types and corresponding intents provided by an institution that the dialog system is being configured for.

At 304, the dialog system identifies a loss function based upon positive and negative key pairs. A positive key pair (k, k') is two keys that match to a same value. For instance, using the example illustrated above in Table 1, the keys "How can I open an account?" and "Get me a new account" match the same value, http://xxx.com/open. A negative key pair (k, k") is two keys that match different values. For example, referring again to Table 1, the keys "How can I open an account?" and "Can I close my account?" match to different values.

In some embodiments, many of the values appear with multiple keys in the dataset D. That is, for many values v, there are multiple keys k, k' where k≠k' and both (k, v) ∈ D and (k', v) ∈ D. The more values that have multiple keys, the more data available, and the more accurate the end result. For example, referring to Table 1 above, in D, the keys "How can I open an account?" and "Get me a new account" are both associated with the same value "http://xxx.com/open." These two keys would serve as a positive training pair for the procedure.

$$P=\{(k,k'):(k,v) \in D, (k',v) \in D, k \neq k'\} \quad [4]$$

is the set of positive training pairs for the dataset D. The positive training pairs P may be extended to training triples T by adding a randomly chosen negative key k" to each pair, where the negative key k" is associated with a different value to the other keys:

$$T=\{(k,k',k''):(k,v), (k',v), (k'',v'') \in D; k \neq k' \& k' \neq k'' \& k'' \neq k; v \neq v''\} \quad [5]$$

Alternatively, training triples may be chosen by another approach. Given training data $D=((k_1, v_1), \ldots, (k_n, v_n))$ consisting of key-value pairs, that defined a set of triples T={(k,k',k")}, let:

$$\text{BestKey}(k, D)=\text{argmax}_{k'} \max_{d', (k',d') \in D} \text{Match}(k, k') \quad [6]$$

That is, BestKey (k, D) returns the key k' in data D that best matches key k. Let $D_v=\{(k', v'):(k', v') \in D, v=v'\}$ be the subset of D that contains just the pairs with value v. Then for every (k, v) ∈ D, T contains the triple:

$$(k, \text{BestKey}(k, D_v \backslash \{(k, v)\}), \text{BestKey}(k, D \backslash \{(k, v)\})) \quad [7]$$

That is, for each key-value pair (k, v) in the training data, form a training triple where the positive pair consists of (k,k'), where k'=BestKey(k, Dv\{(k, v)}) is the BestMatch for k within the subset of D of other pairs with value v, and the negative pair consists of (k,k'), where k"=BestKey(k, D\{(k, v)}) is the BestMatch for k within all the other pairs in D.

This procedure tries to make the best matching key in D the same as the best matching key within $D_v$. In some embodiments, this method of selecting training triples is combined with a method which produces all possible triples. One way to do this is to use one method for some percent, e.g., 50% of the training minibatches, and the other method for some percent, e.g., 50% of the training minibatches. This method of selecting training triples is particularly suitable for training a probabilistic model, as described below with respect to FIG. 4.

Upon establishing the positive and negative key pairs, the dialog system may establish a loss function Loss( ) A loss function penalizes incorrect guesses, and can generally be expressed as $$\text{Loss}(\text{Match}\ominus(k,k')-31\ \text{Match}\ominus(k,k'')) \quad [8],$$

where ⊖ is a vector of match function parameters to be established. In some embodiments, sentence embedding function parameters are added to ⊖. By adding the sentence embedding function parameters to ⊖, they can also be optimized together with the match function parameters. In some embodiments, the embedding function's parameters are initialized with values learned from a large external corpus (e.g., using fine-tuning/transfer learning methods).

Example loss functions suitable in this context include a margin-based loss objective:

$$\text{Loss}(s)=\max(c'-s, 0) \quad [9],$$

where c' is the margin, a positive constant hyperparameter. Another example is a smoothed probabilistic version of the margin-based objective that uses the sigmoid function σ( ):

$$\text{Loss}(s)=\log \sigma(c'-s) \quad [10]$$

At 306, the dialog system minimizes the loss function to identify parameters for use in matching, such that a higher match score is assigned for a match of two different keys having the same associated value than for a match of two different keys having different associated values.

In some embodiments, the dialog system optimizes parameters ⊖ using the loss function:

$$L=\Sigma_{(k,k',k'') \in D} \text{Loss}(\text{Match}\ominus(k,k')-\text{Match}\ominus(k,k'')) \quad [11]$$

The dialog system may minimize the loss function with respect to ⊖. This is a training procedure, with a goal is to adjust the parameters ⊖ so that the positive pair (k,k') has a higher match score than the negative pair (k,k"), for each triple (k,k',k") in the training triples T. This is equivalent to ensuring that:

$$s=\text{Match}\ominus(k,k')-\text{Match}\ominus(k,k'')>0 \quad [12].$$

Alternatively, or additionally, computations may be executed to ensure that:

$$s=\text{Match}\ominus(k,k')-\text{Match}\ominus(k,k'')>c' \quad [13].$$

This can make the parameters ⊖ more robust by ensuring a "gap" between the Match( )scores for the positive and the negative pairs. These loss functions may be optimized using methods such as mini-batch stochastic gradient descent (SGD). Regularization techniques such as drop-out may be useful with more complex Match( )functions.

In some embodiments, multiple iterations may be used to fine-tune the parameters. The embeddings in the Match function may be recomputed across multiple iterations. For example, to fine-tune the embeddings, the embeddings for each key in each training triple (k,k',k") can be recomputed at each iteration. In some cases, it may be sufficient to update those embeddings, e.g., every 10 or 100 minibatches, or not at all.

The dialog system may incorporate the parameters ⊖ identified at 306 into the match function for use in identifying a value as described above with respect to FIG. 2.

Figure 4:
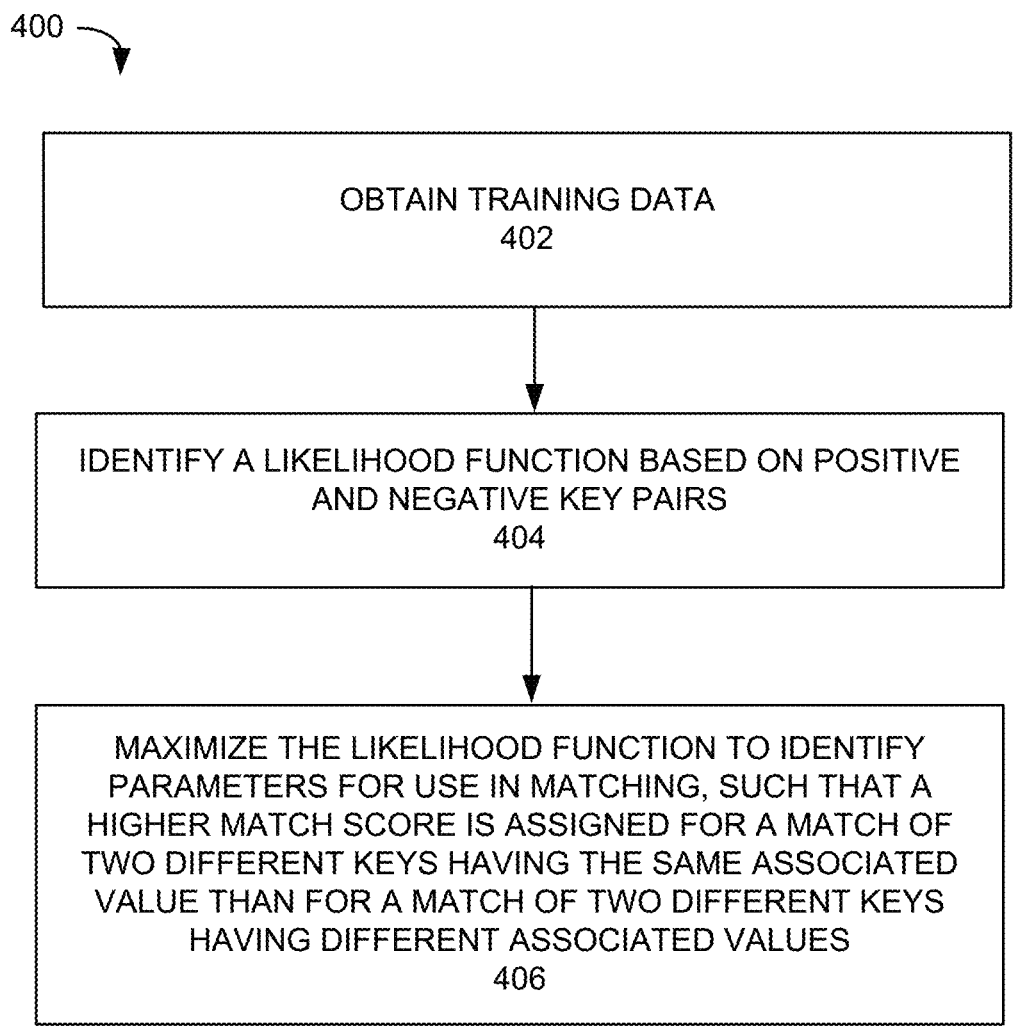
FIG. 4 depicts a simplified flow chart depicting another example of processing performed during a setup phase according to additional embodiments.

FIG. 4 depicts a simplified flowchart 400 depicting processing performed during the setup phase according to certain additional embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 4 may be performed by a dialog system, as described above.

FIG. 4 illustrates a training method which may be suitable with a probabilistic model (e.g., using Equation 2, above). As described above with respect to FIG. 2, prior to receiving the input spoken utterance at 202, the dialog system may execute a training process resulting in set of parameters of the match function. In some embodiments, this involves maximizing a likelihood function of a set of pairs of sample utterances and intents to optimize the match function's parameters, which may be executed using the processing depicted in FIG. 4.

At 402, the dialog system obtains training data. The dialog system may obtain the training data substantially as described above with respect to step 302 of FIG. 3.

At 404, the dialog system identifies a likelihood function based upon positive and negative key pairs. The likelihood function is a function that outputs a value which increases with the likelihood of a set of keys corresponding to a positive key pair. As a specific example, a cross-validation style leave-one-out approximation to the log-likelihood may be used, which uses D both as the set of possible key-value pairs and as the training data for $\ominus$. The following log-likelihood approximation assumes that the match function is symmetric, i.e., Match(k, k')=Match (k', k). The likelihood function may be approximated as:

$$\iota(\ominus) = \Sigma_{(k,v) \in D} \log P_\ominus(v|k, D\backslash\{(k,v)\}) \qquad [14]$$

The log-likelihood sums over all key-value pairs in D. Before calculating the probability of the value v associated with key k, that key-value pair (k, v) may be removed from D, so as to estimate the probability of k matching some other key-value pair in D with value v.

To avoid overflows and underflows (which may arise with exponentials), the following formula may be used when calculating the log-likelihood:

$$\log P_\ominus(v|k, D\backslash\{(k,v)\}) = \log(\Sigma_{(k',v') \in D_v\backslash\{(k,v)\}} \exp(\text{Match}(k,k') - C_{D_v\backslash\{(k,v)\}}(k)) - \log(\Sigma_{(k',v') \in D\backslash\{(k,v)\}} \exp(\text{Match}(k,k') - C_{D\backslash\{(k,v)\}}(k)) + C_{D_v\backslash\{(k,v)\}}(k) - C_{D\{(k,v)\}}(k) \qquad [15]$$

Another example of a likelihood function is the following error-driven learning approximation:

$$\log \sum_{x \in S} \exp(x) \approx \max_{x \in S} x \qquad [16]$$

This approximation is reasonably accurate if the maximum of the values in S is much larger than the sum of all of the other values in S. If this is true of match function values in the log likelihood, then the log likelihood can be approximated as follows:

$$\log P_\ominus(v|k, D\backslash\{(k, v)\}) \approx C_{D_v\backslash\{(k,v)\}}(k) - C_{D\{(k,v)\}}(k) \qquad [17]$$

If the current model correctly predicts the value v associated with key k in the current training pair (k; v) $\in$ D then $C_{D_v\backslash\{(k,v)\}}(k) - C_{D\{(k,v)\}}(k)$ (i.e., there is zero loss), there may be no weight update.

The error-driven learning approximation can provide memory optimization opportunities. Let A(k, D) be the pair in D that best matches the key k, i.e.:

$$A_D(k) = \underset{(k', v') \in D}{\operatorname{argmax}} \text{Match}(k, k') \qquad [18]$$

Then the gradient of the log likelihood contribution of training example (k, v) $\in$ D only depends on the pairs $A_{D_v\backslash\{(k,v)\}}(k)$ and $A_{D\{(k,v)\}}(k)$.

$A_{D_v\backslash\{(k,v)\}}(k)$ and $A_{D\{(k,v)\}}(k)$ may first be computed without computing gradients, which requires relatively low memory usage. The gradients may then be computed for $C_{D_v\backslash\{(k,v)\}}(k) - C_{D\{(k,v)\}}(k)$. Because computing these gradients this only involves two pairs, it should require relatively low memory usage.

There are additional optimization opportunities with the error-driven learning approximation. For example, the embeddings involved in the A computation may be updated irregularly (e.g., once every 10 minibatches or once every iteration), which should make the calculation of A very fast. The actual training updates only involve the C calculations. C may be calculated relatively simply by comparing each training pair (k, v) $\in$ D with the two data pairs identified in the C calculation.

At 406, the dialog system maximizes the likelihood function to optimize the match function's parameters $\ominus$, such that a higher match score is assigned for a match of two different keys having the same associated value than for a match of two different keys having different associated values. $\iota(\ominus)$ may be maximized using techniques such as stochastic gradient descent (SGD).

The partition function [2] involves a sum over the entire training data set D. To back-propagate during training, the embedding calculation of every key in D may be stored in random access memory (RAM), which can be challenging for large D. One technique to reduce the size of set D used in training is by randomly sampling a subset $\tilde{D} \subset D$ at each SGD training step, and using $\tilde{D}$ in place of D in equation [14] or [15]. In this case, it is desirable that $D_v \subset \tilde{D}$ imposes a lower bound on the size of $\tilde{D}$.

The dialog system may incorporate the parameters identified at 406 into the match function for use in identifying a value as described above with respect to FIG. 2.

The techniques described herein have multiple advantages. Because the keys k are not "built into" the Match( ) function as they would be in a classifier (instead, they are provided as parameters to the Match( )function), the Match( )function can evaluate how well the speech input q matches the key k even if the key k does not appear in the training data used to estimate the Match( ) function's parameters $\ominus$. This means it is possible to change the set D of keys (example sentences) and values (e.g., intents) without (re)training the parameters $\ominus$. Further, training data is easy for non-experts to produce (namely, multiple questions that should return the same answer), and may already be present in existing datasets.

As a specific example of advantageous application of these techniques, a chatbot and digital assistant development tool can be provided where the developer (e.g., using the value recognition techniques described herein as a cloud service) can add or remove pairs from the set D, including adding pairs with new values or removing all pairs for one or more values, and then immediately test and/or deploy the chatbot or digital assistant with the new updated set D. There is no need to wait for the system to train a new set of parameters $\ominus$. For example, the chatbot or digital assistant developer might add the pair ("what will the weather be like tomorrow?", FIND-WEATHER) to the set D. Then immediately the system would recognize a speech input "what's the weather going to be tomorrow?" as belonging to the value FIND-WEATHER. In contrast, with traditional techniques, frequent retraining is required as the data set increases. Reducing the amount of additional training required can greatly increase the speed with which value recognition can be performed. Further, tests have shown that the accuracy of value recognition using the matching-based techniques described herein can exceed the accuracy of value recognition using prior approaches such as classification.

The infrastructure described above can be implemented in various different environments including a cloud environment (could be various types of clouds including private, public, and hybrid cloud environments), on-premises environment, a hybrid environment, and the like.

Figure 5:
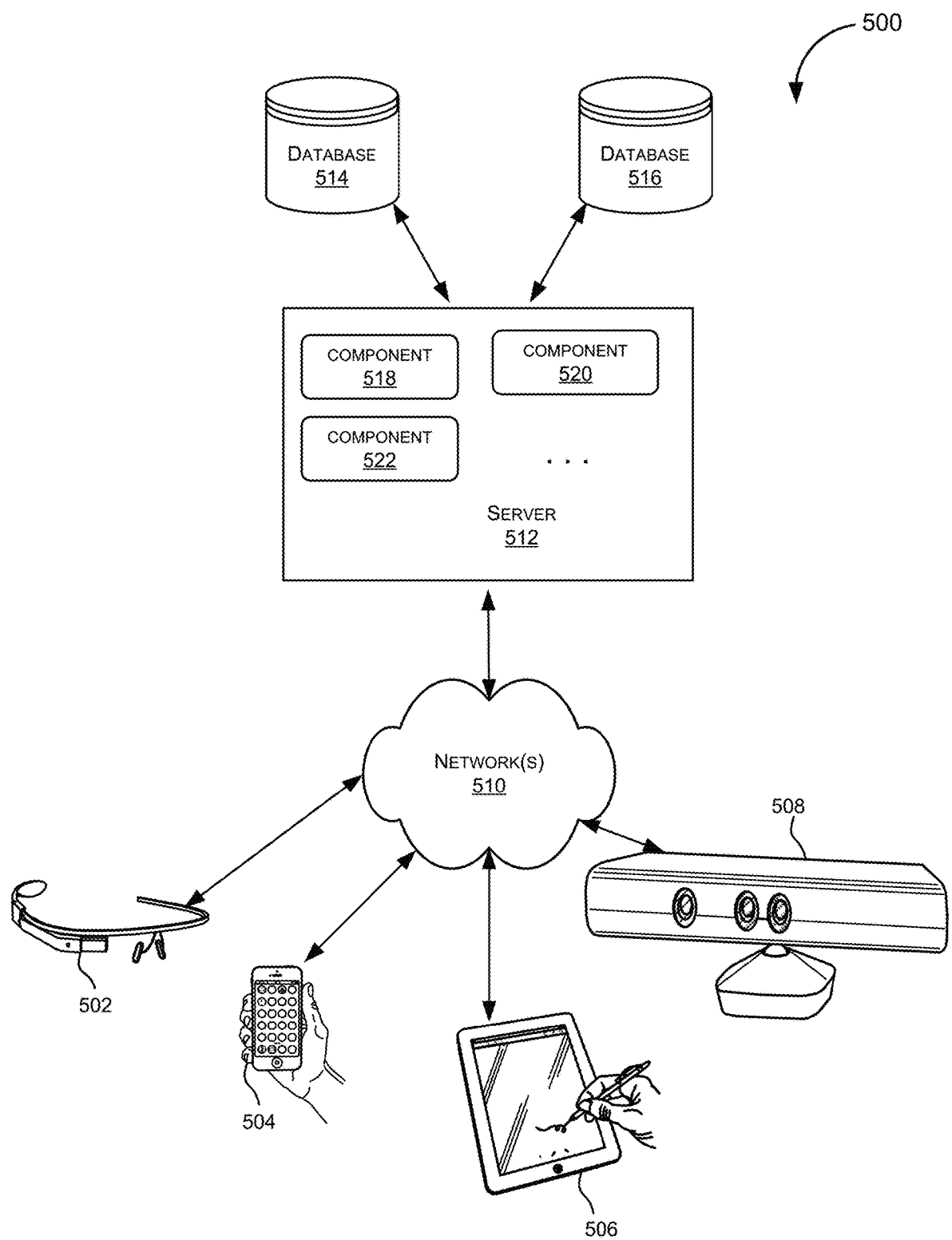
FIG. 5 depicts a simplified diagram of a distributed system for implementing an embodiment.

FIG. 5 depicts a simplified diagram of a distributed system 500 for implementing an embodiment. In the illustrated embodiment, distributed system 500 includes one or more client computing devices 502, 504, 506, and 508, coupled to a server 512 via one or more communication networks 510. Clients computing devices 502, 504, 506, and 508 may be configured to execute one or more applications.

In various embodiments, server 512 may be adapted to run one or more services or software applications that enable value recognition to be performed with reduced training.

In certain embodiments, server 512 may also provide other services or software applications that can include non-virtual and virtual environments. In some embodiments, these services may be offered as web-based or cloud services, such as under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, server 512 may include one or more components 518, 520 and 522 that implement the functions performed by server 512. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, and/or 508 to more quickly and accurately determine a value based upon a received speech input in accordance with the teachings of this disclosure. A client device may provide an interface that enables a user of the client device to interact with the client device. The client device may also output information to the user via this interface. Although FIG. 5 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g.,)iPad® , personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 510 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 510 can be a local area network (LAN), networks based upon Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization such as one or more flexible pools of logical storage devices that can be virtualized to maintain virtual storage devices for the server. In various embodiments, server 512 may be adapted to run one or more services or software applications that provide the functionality described in the foregoing disclosure.

The computing systems in server 512 may run one or more operating systems including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more data repositories 514, 516. These data repositories may be used to store data and other information in certain embodiments. For example, one or more of the data repositories 514, 516 may be used to store information such as key-value pairs corresponding to speech input types and values. Data repositories 514, 516 may reside in a variety of locations. For example, a data repository used by server 512 may be local to server 512 or may be remote from server 512 and in communication with server 512 via a network-based or dedicated connection. Data repositories 514, 516 may be of different types. In certain embodiments, a data repository used by server 512 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 514, 516 may also be used by applications to store application data. The data repositories used by applications may be of different types such as, for example, a key-value store repository, an object store repository, or a general storage repository supported by a file system.

Figure 6:
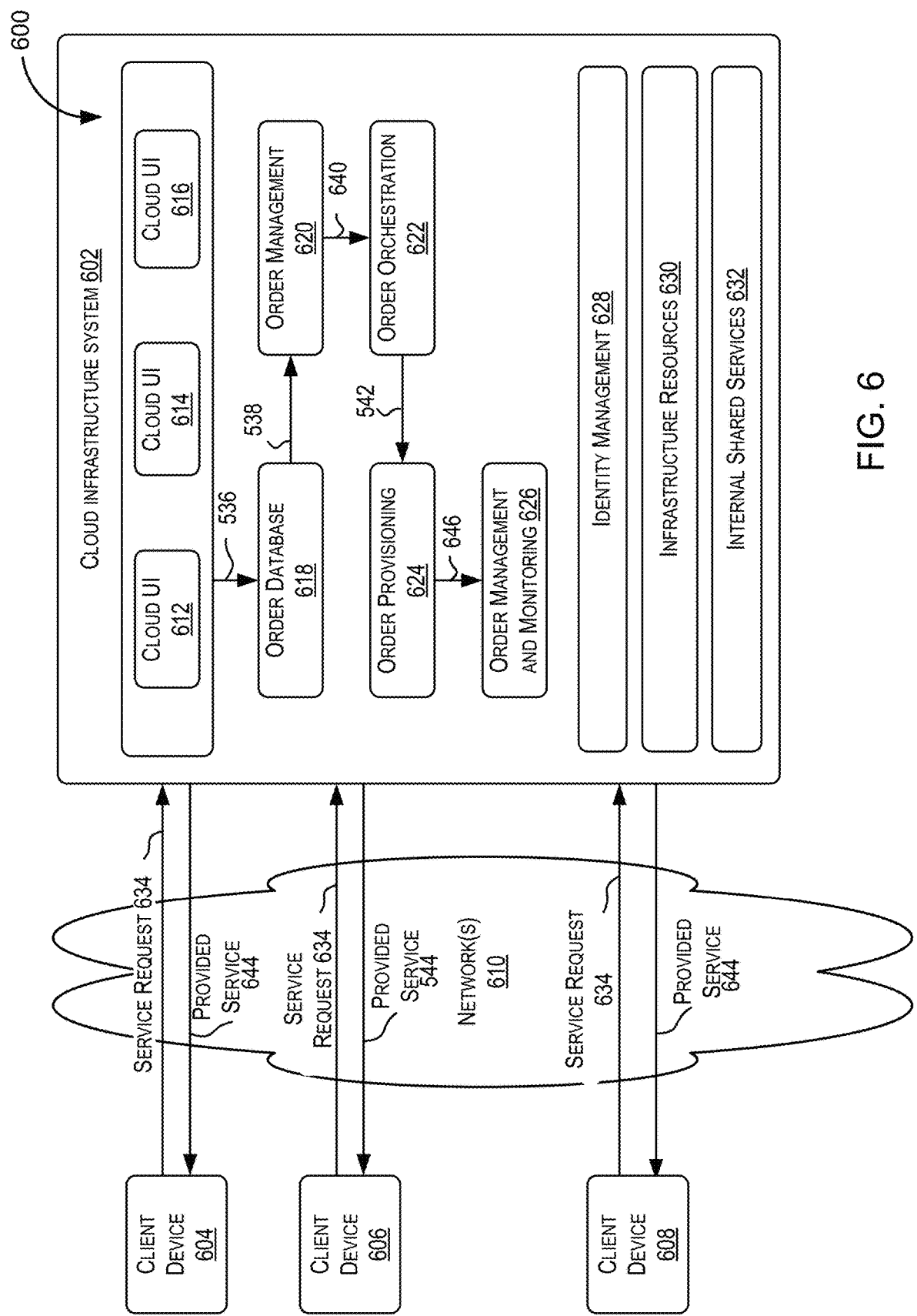
FIG. 6 is a simplified block diagram of a cloud-based system environment in which various services may be offered as cloud services, in accordance with certain embodiments.

In certain embodiments, the value recognition-related functionalities described in this disclosure may be offered as services via a cloud environment. FIG. 6 is a simplified block diagram of a cloud-based system environment in which various value recognition-related services may be offered as cloud services, in accordance with certain embodiments. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 612. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other embodiments, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative embodiments.

The term cloud service is generally used to refer to a service that is made available to users on demand and via a communication network such as the Internet by systems (e.g., cloud infrastructure system 602) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain embodiments, cloud infrastructure system 602 may provide one or more cloud services using different models such as under a Software as a Service (SaaS) model, a Platform as a Service (PaaS) model, an Infrastructure as a Service (IaaS) model, and others, including hybrid service models. Cloud infrastructure system 602 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 602. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 602. Cloud infrastructure system 602 then performs processing to provide the services requested in the customer's subscription order. For example, a customer may supply a set of key-value pairs which the system uses to train models for determining values on the cloud based upon speech input types received by the customer. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public customer, where the customer can be an individual or an enterprise. In certain other embodiments, under a private cloud model, cloud infrastructure system 602 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 602, 604, 606, and 608 depicted in FIG. 6) and may be capable of operating one or more client applications. A user may use a client device to interact with cloud infrastructure system 602, such as to request a service provided by cloud infrastructure system 602. For example, a user may use a client device to request a value recognition-related service described in this disclosure.

In some embodiments, the processing performed by cloud infrastructure system 602 for providing value recognition-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 602 for training purposes to identify parameters for the match function. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain embodiments, to facilitate efficient provisioning of these resources for supporting the various cloud services provided by cloud infrastructure system 602 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users or customers of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a customer may, using a client device, request (service request 634) one or more services provided by cloud infrastructure system 602 using one or more of interfaces 614, 616, and 618. For example, a customer may access the online store, browse cloud services offered by cloud infrastructure system 602, and place a subscription order for one or more services offered by cloud infrastructure system 602 that the customer wishes to subscribe to. The service request may include information identifying the customer and one or more services that the customer desires to subscribe to. For example, a customer may place a subscription order for a value recognition-related service offered by cloud infrastructure system 602. As part of the order, the customer may provide information identifying historical speech input types and values and/or current speech input types.

In certain embodiments, such as the embodiment depicted in FIG. 6, cloud infrastructure system 602 may comprise an order management subsystem (OMS) 620 that is configured to process the new order. As part of this processing, OMS 620 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 602 may send a response or notification 644 to the requesting customer to indicate when the requested service is now ready for use. In some instances, information (e.g., a link) may be sent to the customer that enables the customer to start using and availing the benefits of the requested services.

Cloud infrastructure system 602 may provide services to multiple customers. For each customer, cloud infrastructure system 602 is responsible for managing information related to one or more subscription orders received from the customer, maintaining customer data related to the orders, and providing the requested services to the customer. Cloud infrastructure system 602 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 602 may provide services to multiple customers in parallel. Cloud infrastructure system 602 may store information for these customers, including possibly proprietary information. In certain embodiments, cloud infrastructure system 602 comprises an identity management subsystem (IMS) 628 that is configured to manage customers information and provide the separation of the managed information such that information related to one customer is not accessible by another customer. IMS 628 may be configured to provide various security-related services such as identity services, such as information access management, authentication and authorization services, services for managing customer identities and roles and related capabilities, and the like.

Figure 7:
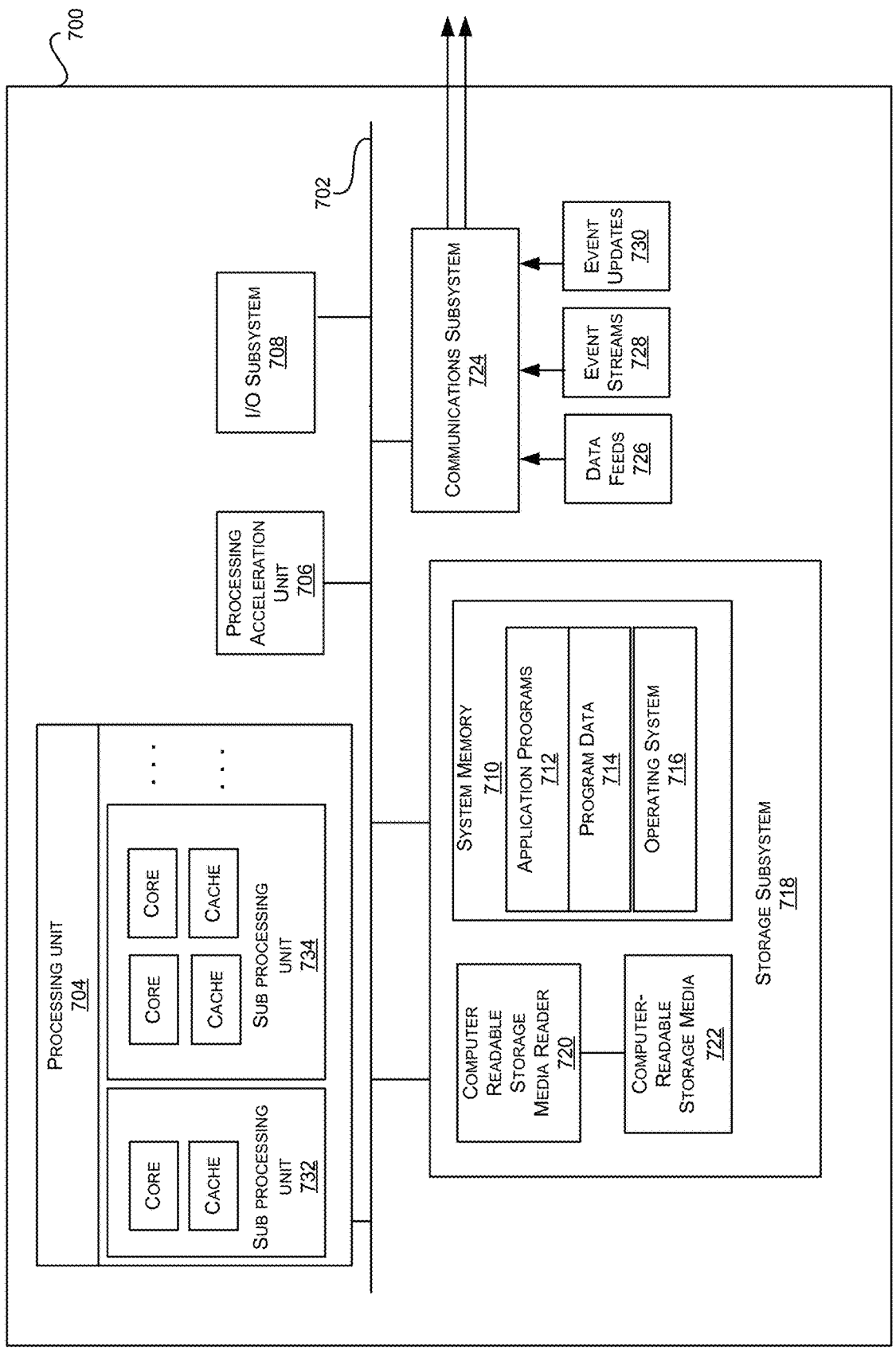
FIG. 7 illustrates an exemplary computer system that may be used to implement certain embodiments.

FIG. 7 illustrates an exemplary computer system 700 that may be used to implement certain embodiments. For example, in some embodiments, computer system 700 may be used to implement any of the dialog system and various servers and computer systems described above. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain embodiments, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some embodiments. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 722 may store programming and data constructs that provide the functionality of some embodiments. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based upon non-volatile memory such as flash-memory based SSDs, enterprise flash drives, solid state ROM, and the like, SSDs based upon volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 718 may also include a computer-readable storage media reader 720 that can further be connected to computer-readable storage media 722. Reader 720 may receive and be configured to read data from a memory device such as a disk, a flash drive, etc.

Furthermore, the programming and/or data constructs that provide the functionality of some embodiments can also be provided by downloading to a computer, for example, computer system 700 via one or more networks.

In certain embodiments, computer system 700 may support virtualization technologies, including but not limited to virtualization of processing and memory resources. For example, computer system 700 may provide support for executing one or more virtual machines. In certain embodiments, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, the communication subsystem may be used to receive speech input from a client device and send a value to the client device in response.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based upon the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method comprising:
   receiving, by a dialog system, an input spoken utterance;
   generating, by the dialog system, a vector representation of the input spoken utterance;
   generating, by the dialog system using a match function, a match score for each key-value pair in a plurality of key-value pairs, wherein values, of the plurality of key-value pairs, are intents, wherein the match score generated for each key-value pair is indicative of a degree of matching of a key of the key-value pair to the vector representation of the input spoken utterance, wherein each key in the plurality of key-value pairs is a multidimensional vector representation of a sentence, and wherein the match function is configured to generate a higher match score for a match of two different keys having the same associated value than for a match of two different keys having different associated values, and wherein the match function comprises model parameters learned using training data comprising a set of training values, each training value of the set of training values paired to multiple training keys that match the training value;

identifying, by the dialog system based upon the match scores generated for the plurality of key-value pairs, a particular key-value pair from the plurality of key-value pairs with the highest match score;

traversing, by the dialog system, the particular key-value pair with the highest match score to identify a value for the input spoken utterance;

outputting, by the dialog system, the value for the input spoken utterance, wherein the input spoken utterance is a first input spoken utterance, the value is a first value, the match score is a first match score;

after outputting the first value for the first input spoken utterance,
updating, by the dialog system, the plurality of key-value pairs to include additional key-value pairs comprising new intents received as input to the dialog system; receiving, by the dialog system, a second input spoken utterance;

generating, by the dialog system using the match function, a second match score for each key-value pair in the updated plurality of key-value pairs, wherein the match function is unchanged and not retrained between generating the first match score and generating the second match score;

identifying, by the dialog system, a second particular key-value pair from the updated plurality of key-value pairs with the highest match score; and outputting, by the dialog system, a second value associated with the second particular key-value pair as a value for the input spoken utterance.

2. The method of claim 1, further comprising:
training the match function using the training data, wherein the training comprises adjusting a set of parameters associated with the match function by minimizing a loss function.

3. The method of claim 1, further comprising:
training the match function using the training data, wherein the training comprises adjusting a set of parameters associated with the match function by maximizing a likelihood function.

4. The method of claim 1, wherein:
the match function includes one of a cosine similarity function, a bilinear function, a single-layer network, a multilayer network, or a nearest-neighbor function.

5. A non-transitory computer-readable memory storing a plurality of instructions executable by one or more processors, the plurality of instructions comprising instructions that when executed by the one or more processors cause the one or more processors to perform processing comprising:
receiving an input spoken utterance;
generating a vector representation of the input spoken utterance;
generating, using a match function, a match score for each key-value pair in a plurality of key-value pairs, wherein values, of the plurality of key-value pairs, are intents, wherein the match score generated for each key-value pair is indicative of a degree of matching of a key of the key-value pair to the vector representation of the input spoken utterance, wherein each key in the plurality of key-value pairs is a multidimensional vector representation of a sentence, and wherein the match function is configured to generate a higher match score for a match of two different keys having the same associated value than for a match of two different keys having different associated values, and wherein the match function comprises model parameters learned using training data comprising a set of training values, each training value of the set of training values paired to multiple training keys that match the training value;

identifying, based upon the match scores generated for the plurality of key-value pairs, a particular key-value pair from the plurality of key-value pairs with the highest match score;

traversing the particular key-value pair with the highest match score to identify a value for the input spoken utterance;

outputting the value for the input spoken utterance, wherein the input spoken utterance is a first input spoken utterance, the value is a first value, the match score is a first match score;

after outputting the first value for the first input spoken utterance,
updating the plurality of key-value pairs to include additional key-value pairs comprising new intents received as input;
receiving a second input spoken utterance;
generating, using the match function, a second match score for each key-value pair in the updated plurality of key-value pairs, wherein the match function is unchanged and not retrained between generating the first match score and generating the second match score;
identifying a second particular key-value pair from the updated plurality of key-value pairs with the highest match score; and
outputting a second value associated with the second particular key-value pair as a value for the input spoken utterance.

6. The non-transitory computer-readable memory of claim 5, the processing further comprising:
training the match function using the training data, wherein the training comprises adjusting a set of parameters associated with the match function by minimizing a loss function.

7. The non-transitory computer-readable memory of claim 5, the processing further comprising:
training the match function using the training data, wherein the training comprises adjusting a set of parameters associated with the match function by maximizing a likelihood function.

8. The non-transitory computer-readable memory of claim 5, wherein:
the match function includes one of a cosine similarity function, a bilinear function, a single-layer network, a multilayer network, or a nearest-neighbor function.

9. A dialog system comprising:
one or more processors;
a memory coupled to the one or more processors, the memory storing a plurality of instructions executable by the one or more processors, the plurality of instructions comprising instructions that when executed by the one or more processors cause the one or more processors to perform processing comprising:

receiving an input spoken utterance;
generating a vector representation of the input spoken utterance;
generating, using a match function, a match score for each key-value pair in a plurality of key-value pairs, wherein values, of the plurality of key-value pairs, are intents, wherein the match score generated for each key-value pair is indicative of a degree of matching of a key of the key-value pair to the vector representation of the input spoken utterance, wherein each key in the plurality of key-value pairs is a multidimensional vector representation of a sentence, and wherein the match function is configured to generate a higher match score for a match of two different keys having the same associated value than for a match of two different keys having different associated values, and wherein the match function comprises model parameters learned using training data comprising a set of training values, each training value of the set of training values paired to multiple training keys that match the training value;
identifying, based upon the match scores generated for the plurality of key-value pairs, a particular key-value pair from the plurality of key-value pairs with the highest match score;
traversing the particular key-value pair with the highest match score to identify a value for the input spoken utterance;
outputting the value for the input spoken utterance, wherein the input spoken utterance is a first input spoken utterance, the value is a first value, the match score is a first match score;
after outputting the first value for the first input spoken utterance,
updating the plurality of key-value pairs to include additional key-value pairs comprising new intents received as input to the dialog system;
receiving a second input spoken utterance;
generating, using the match function, a second match score for each key-value pair in the updated plurality of key-value pairs, wherein the match function is unchanged and not retrained between generating the first match score and generating the second match score;
identifying a second particular key-value pair from the updated plurality of key-value pairs with the highest match score; and
outputting a second value associated with the second particular key-value pair as a value for the input spoken utterance.

10. The dialog system of claim 9, the processing further comprising:
training the match function using the training data, wherein the training comprises adjusting a set of parameters associated with the match function by minimizing a loss function or by maximizing a likelihood function.

11. The dialog system of claim 9, wherein:
the match function includes one of a cosine similarity function, a bilinear function, a single-layer network, a multilayer network, or a nearest-neighbor function.

* * * * *

UNITED STATES PATENT AND TRADEMARK OFFICE
CERTIFICATE OF CORRECTION

PATENT NO. : 11,914,962 B2
APPLICATION NO. : 16/942535
DATED : February 27, 2024
INVENTOR(S) : Johnson It is certified that error appears in the above-identified patent and that said Letters Patent is hereby corrected as shown below:

In the Specification

In Column 5, Line 37, delete "response" and insert -- response. --, therefor.

In Column 14, Line 25, delete "⊖.D)" and insert -- ⊖,D) --, therefor.

In Column 15, Line 54, delete "directions?"" and insert -- directions?"). --, therefor.

In Column 17, Line 67, delete "Loss( )" and insert -- Loss( ). --, therefor.

In Column 18, Line 3, delete "Loss(Match⊖(k,k')-31 Match⊖(k,k"))" and insert -- Loss(Match$_\ominus$($k,k'$) − Match$_\ominus$($k,k''$) ) --, therefor.

In Column 18, Line 37, delete "[12]." and insert -- [12] --, therefor.

In Column 18, Line 37, delete "$s$=Match⊖($k,k'$)–Match⊖($k,k''$)>0" and insert -- $s$ = Match$_\ominus$($k,k'$) − Match$_\ominus$($k,k''$) > 0 --, therefor.

In Column 18, Line 40, delete "$s$=Match⊖($k,k'$)–Match⊖($k,k''$)>c'" and insert -- $s$ = Match$_\ominus$($k,k'$) − Match$_\ominus$($k,k''$) > $c'$ --, therefor.

In Column 18, Line 40, delete "[13]." and insert -- [13] --, therefor.

In Column 19, Line 33, delete "ι(⊖)=" and insert -- $l(\theta)$ = --, therefor.

Signed and Sealed this
Ninth Day of July, 2024

Katherine Kelly Vidal
*Director of the United States Patent and Trademark Office*

CERTIFICATE OF CORRECTION (continued)
U.S. Pat. No. 11,914,962 B2

In Column 20, Line 11, delete "$C_{D_{v|\{(k,v)\}}}$" and insert -- $C_{D_v \setminus \{(k,v)\}}$ --, therefor.

In Column 20, Line 29, delete "ι(ϴ)" and insert -- $l(\theta)$ --, therefor.

In Column 22, Line 4, delete "(e.g.,)iPad®," and insert -- (e.g., iPad®), --, therefor.

In Column 28, Line 58, delete "Google)" and insert -- Google --, therefor.

In Column 31, Line 8, delete "evolution)," and insert -- evolution)), --, therefor.